(12) United States Patent
Kobayashi

(10) Patent No.: US 9,348,144 B2
(45) Date of Patent: May 24, 2016

(54) DISPLAY DEVICE AND CONTROL METHOD THEREOF

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 85 days.

(21) Appl. No.: 14/109,568

(22) Filed: Dec. 17, 2013

(65) Prior Publication Data

US 2014/0191942 A1      Jul. 10, 2014

(30) Foreign Application Priority Data

Jan. 7, 2013   (JP) .................................. 2013-000363

(51) Int. Cl.
  *G02B 27/01*        (2006.01)
  *G06F 3/01*         (2006.01)

(52) U.S. Cl.
  CPC .......... *G02B 27/0172* (2013.01); *G02B 27/017* (2013.01); *G06F 3/012* (2013.01); *G02B 2027/014* (2013.01); *G02B 2027/0187* (2013.01)

(58) Field of Classification Search
  CPC ............. G02B 27/0172; G02B 27/017; G02B 2027/0187; G02B 2027/014; G06F 3/012
  See application file for complete search history.

(56) References Cited

U.S. PATENT DOCUMENTS

| | | | | |
|---|---|---|---|---|
| 8,854,452 | B1* | 10/2014 | Raffle | G09G 3/003 345/7 |
| 2002/0071287 | A1* | 6/2002 | Haase | G02B 27/20 362/553 |
| 2008/0030461 | A1* | 2/2008 | Matsui et al. | 345/156 |
| 2012/0242560 | A1* | 9/2012 | Nakada et al. | 345/8 |
| 2013/0093661 | A1* | 4/2013 | Ali | G06F 3/147 345/156 |
| 2013/0127980 | A1* | 5/2013 | Haddick | G06F 3/013 348/14.08 |

FOREIGN PATENT DOCUMENTS

| | | |
|---|---|---|
| JP | 2000-29619 A | 1/2000 |
| JP | 2000-284886 A | 10/2000 |
| JP | 2002-259046 A | 9/2002 |
| JP | 2008-17501 A | 1/2008 |

* cited by examiner

*Primary Examiner* — Liliana Cerullo
(74) *Attorney, Agent, or Firm* — ALG Intellectual Property, LLC

(57) ABSTRACT

A head-mounted display device includes: a display section that outputs an image light to overlap with an outside light and causes an image to be viewed; and an input detecting section that detects an input operation in a case where a predetermined light is determined in a range corresponding to the image.

11 Claims, 8 Drawing Sheets

DISPLAY DEVICE AND CONTROL METHOD THEREOF

BACKGROUND

1. Technical Field

The present invention relates to a display device, and a control method thereof.

2. Related Art

In the related art, as a method of an input operation for a display device that a user wears, a technique for detecting a gesture from a user finger has been proposed (for example, see JP-A-2008-17501).

In such a related art technique, a complicated device is not necessary and the device that is simple to use is provided. On the other hand, a motion that is not understood by persons other than the user is necessary, which may bring anxiety to the user about making a strange impression on the surrounding people. Thus, it is desirable to reduce a psychological effect on the user.

Further, in a display device that displays an image so that a scene other than the displayed image can be viewed, including a display device that a user wears, it is desirable to perform an input operation so as not to impair the visibility of the scene other than the displayed image.

SUMMARY

An advantage of some aspects of the invention is to provide a technique capable of providing a simple use operation method to enhance the operability in a display device.

An aspect of the invention is directed to a display device including: a display section that produces, by outputting an image light, a scene viewed by light other than the image light and an image based on the image light to be viewed; and an operation detecting section that detects an input operation in a case where a predetermined light is determined in a range corresponding to the image.

According to this configuration, since the display device detects the input operation when the predetermined light is detected in a range of the image viewed by a user, the user may have the input operation to be detected only by operating any device to emit the predetermined light. Since the input operation may be performed by emitting light, for example, using a light emitting device or the like to detect the predetermined light, it is possible to perform the input operation without impairing the visibility of the scene viewed by the user, for example, with less influence on the scene viewed by the user.

Another aspect of the invention is directed to a head-mounted display device including: a display section that outputs an image light to overlap with an outside light and causes an image to be viewed; and an operation detecting section that detects an input operation in a case where a predetermined light is determined in a range corresponding to the image.

According to this configuration, since the head-mounted display device detects the input operation when the predetermined light is detected in a range of the image viewed by a user, the user can cause the input operation to be detected only by operating any device to emit the predetermined light. This operation does not bring anxiety to the user about making a strange impression on the surrounding people, and thus, the user can execute the operation without feeling anxious about the periphery. Further, the device used by the user may not be connected to a display device, and may be any device that can emit the predetermined light without any limitation. For example, a device for other usages may be used. Thus, it is not necessary to use an exclusive device, thereby making it possible to simplify the operation. Further, since the position where the input operation is detected by the predetermined light is present in the range corresponding to the image viewed by the user, it is possible to accurately perform the input operation without detection of the input operation due to an unrelated ambient light. Accordingly, it is possible to enhance the operability of the head-mounted display device.

Still another aspect of the invention is directed to the display device described above, wherein the display device further includes an outside detecting section that detects an outside light corresponding to a visual field of a user of the display device, and the operation detecting section detects the predetermined light from the outside light detected by the outside light detecting section.

According to this configuration, it is possible to rapidly detect the light emitted by the operation of the user with a simple structure, thereby further enhancing the operability.

Yet another aspect of the invention is directed to the display device described above, wherein the operation detecting section detects the input operation in a case where the predetermined light is detected at a position corresponding to an input detection area that is virtually set.

According to this configuration, since a case where the input operation is detected corresponds to a case where the predetermined light is detected at the position corresponding to the input detection area, it is possible to accurately perform the input operation without detection of the input operation due to an unrelated ambient light.

Still yet another aspect of the invention is directed to the display device described above, wherein a plurality of operation targets are arranged in the input detection area, and the operation detecting section determines that the operation target corresponding to the position where the predetermined light is detected is operated.

According to this configuration, since the plurality of operation targets on which the input operation is detected by the predetermined light is arranged, the user can perform plural types of input operations from the position where the light is emitted, thereby making it possible to further enhance the operability.

Further another aspect of the invention is directed to the display device described above, wherein the predetermined light is a visible light.

According to this configuration, the user can view the light emitted for the input operation, thereby making it possible to operate simply and accurately.

Still further another aspect of the invention is directed to the display device described above, wherein the predetermined light includes light with a plurality of wavelength bands.

According to this configuration, since the input operation is detected by the light with the plurality of wavelength bands, it is possible to accurately perform the input operation without detection of the input operation due to an unrelated ambient light.

Yet further another aspect of the invention is directed to the display device described above, wherein the display device further includes a display control section that performs a display indicating the input operation detected by the operation detecting section in the image.

According to this configuration, since the user can visually recognize that the input operation is detected, it is possible to have a simple and accurate operation.

Still yet further another aspect of the invention is directed to the display device described above, wherein the display device is a head-mounted display device that causes a user to view the image, the display section includes: an image light generating section that generates and emits the image light for display of the image using display image data; and an optical member that guides the emitted image light to eyes of the user, and the outside light passes through the optical member and is incident onto the eyes of the user together with the image light.

According to this configuration, using the head-mounted display device in which the image light is guided to the eyes of the user by the optical member and the outside light passes through the optical member and is guided to the eyes of the user, in a case where the predetermined light is detected as the outside light, the input operation is detected. Thus, since the head-mounted display device detects the input operation when the predetermined light is detected in the range where the outside light is viewed by the user, the user can cause the input operation to be detected only by operating any device to emit the predetermined light. Further, by performing display by a see-through display device, it is possible to realize high operability.

A further aspect of the invention is directed to a control method of a display device, including: causing, by outputting an image light, a scene viewed by light other than the image light and an image based on the image light to be viewed; and detecting an input operation in a case where a predetermined light is determined in a range corresponding to the image.

According to this configuration, since the display device detects the input operation when the predetermined light is detected in a range of the image viewed by a user, the user can cause the input operation to be detected only by operating any device to emit the predetermined light. Since the input operation can be performed by emitting light, for example, using a light emitting device or the like to detect the predetermined light, it is possible to reduce the influence on a scene viewed by the user, and to perform the input operation so as not to impair the visibility of the scene viewed by the user, for example.

A still further aspect of the invention is directed to a control method of a display device that includes a display section that outputs an image light to overlap with an outside light and causes an image to be viewed, and is mounted on the head of a user, the method including: detecting an input operation in a case where a predetermined light is determined in a range corresponding to the image.

According to this configuration, since the head-mounted display device detects the input operation when the predetermined light is detected in a range corresponding to the image viewed by a user, the user can cause the input operation to be detected only by operating any device to emit the predetermined light. This operation does not bring anxiety to the user about making a strange impression on the surrounding people, and thus, the user can execute the operation without feeling anxious about the periphery. Further, the device used by the user can not be connected to a display device, and may be any device that can emit the predetermined light without any limitation. For example, a device for other usages may be used. Thus, it is not necessary to use an exclusive device, thereby making it possible to simplify the operation. Further, since the position where the input operation is detected by the predetermined light is present in the range corresponding to the image viewed by the user, it is possible to accurately perform the input operation without detection of the input operation due to an unrelated ambient light. Accordingly, it is possible to enhance the operability of the head-mounted display device.

Here, as the predetermined light, for example, light with one or plural predetermined wavelengths may be used. Further, the predetermined light may be light that is periodically emitted with a predetermined cycle or pattern, that is, pulse light or may be light of which the intensity is periodically changed with a predetermined cycle or pattern. Further, the predetermined light may include a type in which the wavelength of light is changed periodically or with a predetermined pattern, for example, a type in which lights of various colors are sequentially emitted. Further, the predetermined light may include a combination of the various types of lights. Further, the scene based on the light other than the image light is not limited to a surrounding scene or image, and may be any scene that is viewable by the user according to light such as an outside light other than the image light emitted by the display device or light emitted by a different device.

According to the aspects of the invention, it is possible to perform an input operation to the display device by an operation method that a user can simply execute.

BRIEF DESCRIPTION OF THE DRAWINGS

The invention will be described with reference to the accompanying drawings, wherein like numbers reference like elements.

FIGS. 4A and 4B are diagrams illustrating examples of an input auxiliary image displayed by a head-mounted display device and an input operation thereof, in which FIG. 4A illustrates an example in which a virtual keyboard is used, and FIG. 4B illustrates an example in which a virtual input board including an input auxiliary line is used.

FIGS. 5A and 5B are diagrams illustrating an operation using a light emitting device, in which FIG. 5A illustrates an example of an operation using the light emitting device, and FIG. 5B illustrates an example in which a detection area where the operation of the light emitting device is detected is changed.

FIGS. 7A and 7B are diagrams illustrating an operation using a light emitting device, in which FIG. 7A illustrates an example of an operation using the light emitting device, and FIG. 7B illustrates an example in which a detection area where the operation of the light emitting device is detected is changed.

DESCRIPTION OF EXEMPLARY EMBODIMENTS

Hereinafter, embodiments of the invention will be described with reference to the accompanying drawings.

Figure 1:
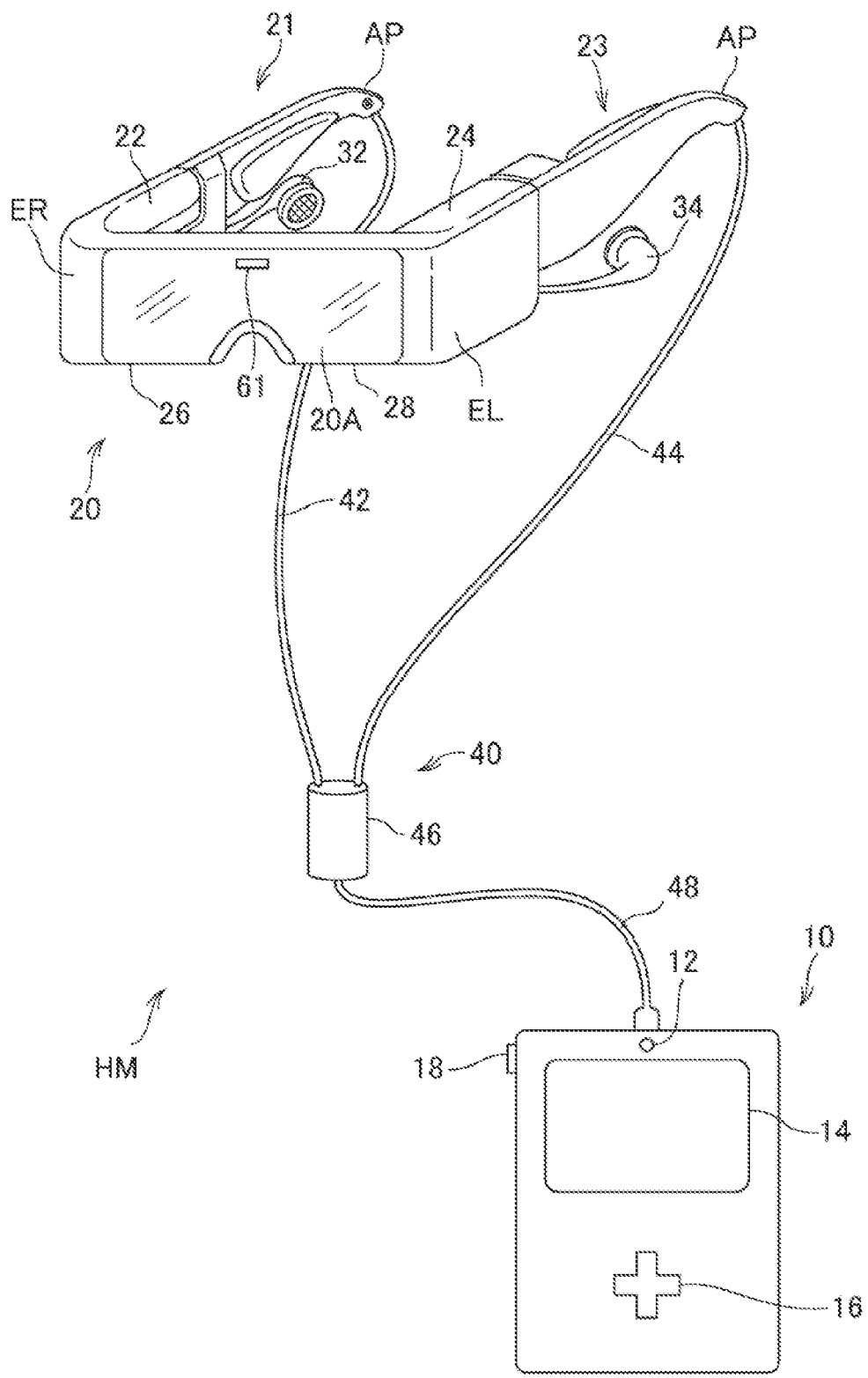
FIG. 1 is a diagram illustrating an appearance of a head-mounted display device according to an embodiment of the invention.

FIG. 1 is a diagram illustrating an appearance of a head-mounted display device according to an embodiment of the invention.

A head-mounted display device HM is a head-mounted display device mounted on the head of a user, and is referred to as a head mounted display (HMD). The head-mounted display device HM of the present embodiment corresponds to a light transmissive head-mounted display device through which a user can directly and simultaneously view an outside scene while viewing a virtual image.

As shown in FIG. 1, the head-mounted display device HM is provided with an image display section 20 mounted on the head of the user, and a control device 10 that controls the image display section 20. The image display section 20 includes a right holding section 21, a right display drive section 22, a left holding section 23, a left display drive section 24, a right optical image display section 26, and a left optical image display section 28.

The right optical image display section 26 and the left optical image display section 28 are respectively disposed in front of the right eye and the left eye of the user, and are integrally connected to each other at a position corresponding to an area between eyebrows of the user. The right holding section 21 extends from an end portion ER of the right optical image display section 26, and the left holding section 23 extends from an end portion EL of the left optical image display section 28.

The right holding section 21 is disposed beside the right side of the head of the user, and a tip thereof is engaged with the right ear of the user. Further, the left holding section 23 is disposed beside the left side of the head of the user, and a tip thereof is engaged with the left ear of the user. The head-mounted display device HM is supported by the tips of the right holding section 21 and the left holding section 23 and a nose pad section provided at a lower end of a junction section of the right optical image display section 26 and the left optical image display section 28.

The right display drive section 22 is built in a base end section of the right holding section 21, and the left display drive section 24 is built in a base end section of the left holding section 23. The head-mounted display device HM causes the right eye and the left eye of the user to view an image using the right display drive section 22 and the left display drive section 24, respectively.

A light adjusting plate 20A is provided on a front side, that is, on a front surface side of the right optical image display section 26 and the left optical image display section 28. The light adjusting plate 20A is detachably mounted to the right optical image display section 26 and the left optical image display section 28, and thus, plural types of light adjusting plates 20A may be mounted to be exchangeable. The light adjusting plate 20A is an optical element of a thin plate shape, and may be various elements such as an element of which optical transparency is almost zero, an element that is approximately transparent, an element in which the intensity of light is attenuated to be transmitted, or an element that attenuates or reflects light of a specific wavelength. By appropriately selecting an optical characteristic of the light adjusting plate 20A, it is possible to adjust the intensity of outside light incident onto the right optical image display section 26 and the left optical image display section 28 from the outside. In the present embodiment, a case where the light adjusting plate 20A that has at least light transparency of such a degree that a user who wears the head-mounted display device HM can view the outside scene is used will be described. The light adjusting plate 20A also has a function of protecting a right light guide plate 261 and a left light guide plate 262 (to be described later) from damage, attachment of dirt or the like.

Further, on the front surface of the head-mounted display device HM, a camera 61 (photographing section) is disposed on a boundary portion between the right optical image display section 26 and the left optical image display section 28. The position of the camera 61 approximately corresponds to the center of the front surface of the head-mounted display device HM, which is an intermediate position of the left and right eyes of the user.

A photographing direction, that is, a view angle of the camera 61 is a front direction of the head-mounted display device HM, that is, a direction in which at least a part of an outside scene in a visual field direction of the user in a state where the user wears the head-mounted display device HM is imaged. Preferably, the photographing direction is a direction in which an outside scene range that the user views through a face 262A is photographed. Further, more preferably, a range wider than the range viewed by the user through the face 262A is photographed. That is, it is preferable that the entire visual field of the user through the light adjusting plate 20A can be photographed.

The camera 61 intermittently photographs still images or photographs moving images, and outputs the photographed image data. The camera 61 in the present embodiment is shown as a single digital camera, but a stereo video camera that includes plural digital cameras may be employed.

Figure 2:
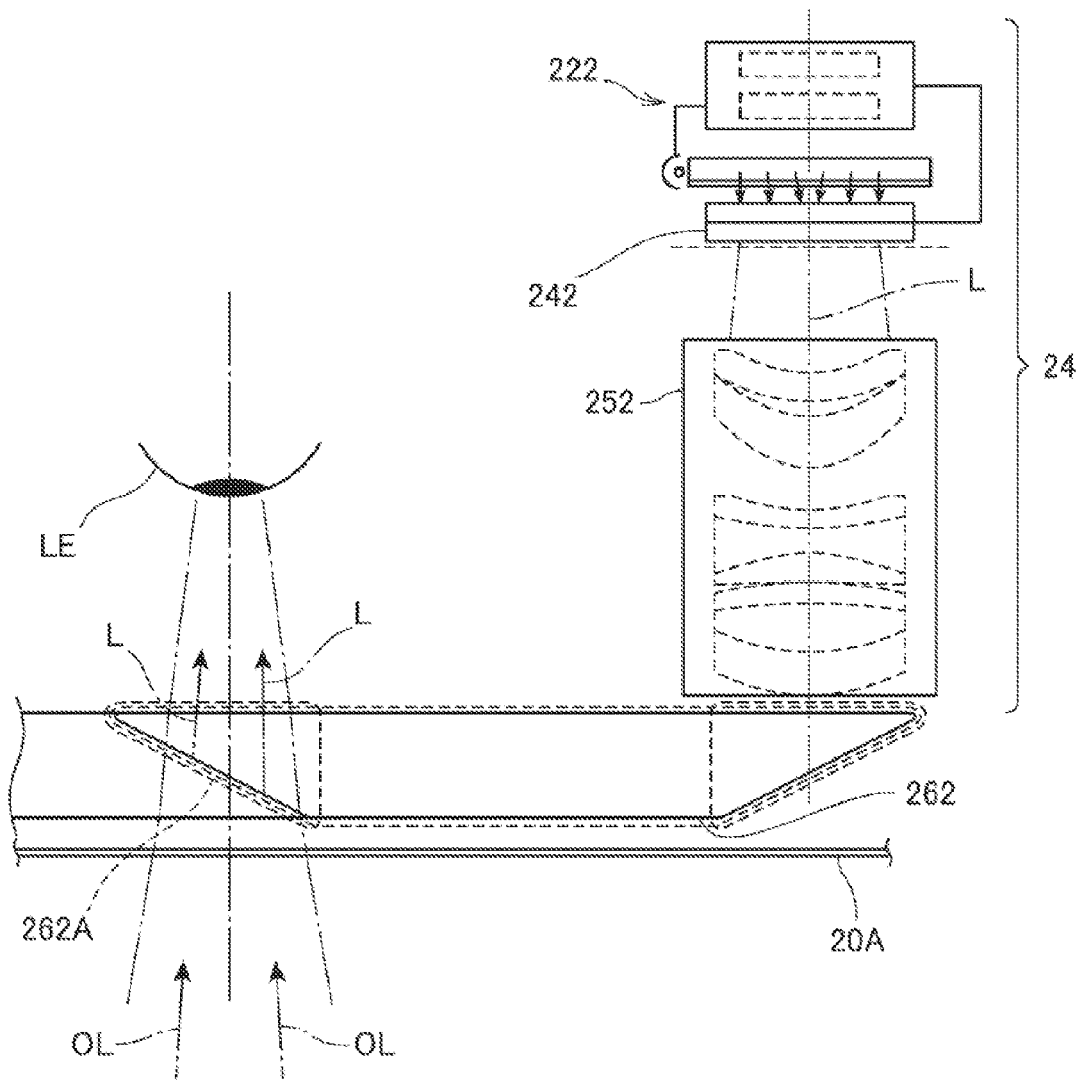
FIG. 2 is a diagram illustrating a schematic configuration of an optical system of a head-mounted display device.

FIG. 2 is a diagram illustrating a schematic configuration of an optical system in the image display section 20. FIG. 2 is a plan view illustrating a configuration of the left display drive section 24 and the left light guide plate 262 that cause the left eye LE of the user to view a virtual image. Since respective configurations that cause the left eye and the right eye of the user to view the virtual image are laterally symmetrical, only the left display drive section 24 and the left light guide plate 262 will be described herein.

The left display drive section 24 of the image display section 20 includes a left backlight 222 that includes a light source such as an LED and a diffusion plate, a transmissive left liquid crystal display (LCD) 242 disposed on an optical path of light emitted from the diffusion plate of the left backlight 222, and a left projection optical system 252 that includes a lens group that guides an image light L that passes through the left LCD 242 and the like.

The left projection optical system 252 is formed by a collimator lens that forms the image light L emitted from the left LCD 242 into a parallel light flux. The image light L passed through the left projection optical system 252 is incident onto the left light guide plate 262. The left light guide plate 262 is a prism in which plural reflection surfaces that reflect the image light L are formed, in which the image light L is subjected to plural reflections in the left light guide plate 262 to be guided to the left eye LE. Further, the image light L reflected on the face 262A disposed in front of the left eye LE is emitted from the right optical image display section 26 toward the left eye LE, and the image light L forms an image on a retina of the left eye LE, to thereby cause the user to view the image.

Here, the left projection optical system. 252 and the left light guide plate 262 are collectively referred to as a "light guide section". The light guide section may use an arbitrary technique as long as a virtual image is formed in front of the eyes of the user using the image light, and for example, may use a diffraction grating or a semi-transmission reflection film.

The face 262A is configured by a half mirror. Thus, an outside light OL that passes through the light adjusting plate 20A, in addition to the image light L reflected on the face 262A, is incident onto the left eye LE of the user. That is, in the head-mounted display device HM, the image light L of the image processed therein and the outside light OL overlap each other to be incident onto the eyes of the user. Thus, the user may view the outside scene through the light adjusting plate 20A of the head-mounted display device HM, and thus, may view the image based on the image light L that overlaps with the outside scene. Thus, the head-mounted display device HM may be referred to as a see-through display device.

As the image light L guided to both eyes of the user of the head-mounted display device HM is formed on the retinas of the user, the user views a virtual image. Here, the visibilities of the outside scene and the virtual image in the user are influenced by balance of the intensities of light of the outside light OL and the image light L. In a case where the intensity of the outside light OL is higher than that of the image light L, the outside scene is more visible, but the visibility of the virtual image processed (displayed) by the head-mounted display device HM is low. On the other hand, in a case where the intensity of the image light L is higher than that of the outside light OL, the visibility of the outside scene is low while the visibility of the virtual image processed (displayed) by the head-mounted display device HM is high.

Returning to FIG. 1, the head-mounted display device HM includes a connection section 40 that connects the image display section 20 to the control device 10. The connection section 40 includes a main body cable 48 connected to the control device 10, and two right and left cables 42 and 44 that are branched from the main body cable 48 through a connection member 46. The right cable 42 is inserted in a casing of the right holding section 21 and is connected to the right display drive section 22. The left cable 44 is inserted in a casing of the left holding section 23 and is connected to the left display drive section 24.

The image display section 20 and the control device perform transmission of various signals through the connection section 40. For example, a metal cable or an optical fiber may be employed as the right cable 42, the left cable 44 and the main body cable 48.

The control device 10 is a device for operating the head-mounted display device HM. The control device 10 includes a lighting section 12, a touch pad 14, a cross key 16, and a power switch 18.

The lighting section 12 is provided with an indicator that includes an LCD or the like, and notifies an operation state (for example, power ON/OFF or the like) of the head-mounted display device HM according to light emission state thereof. The touch pad 14 detects a contact operation through a finger of the user, and outputs a signal based on detection content. The cross key 16 is a key corresponding to up, down, left and right directions, and outputs a signal based on a pressing operation. The power switch 18 is a switch that switches a power state of the head-mounted display device HM.

Figure 3:
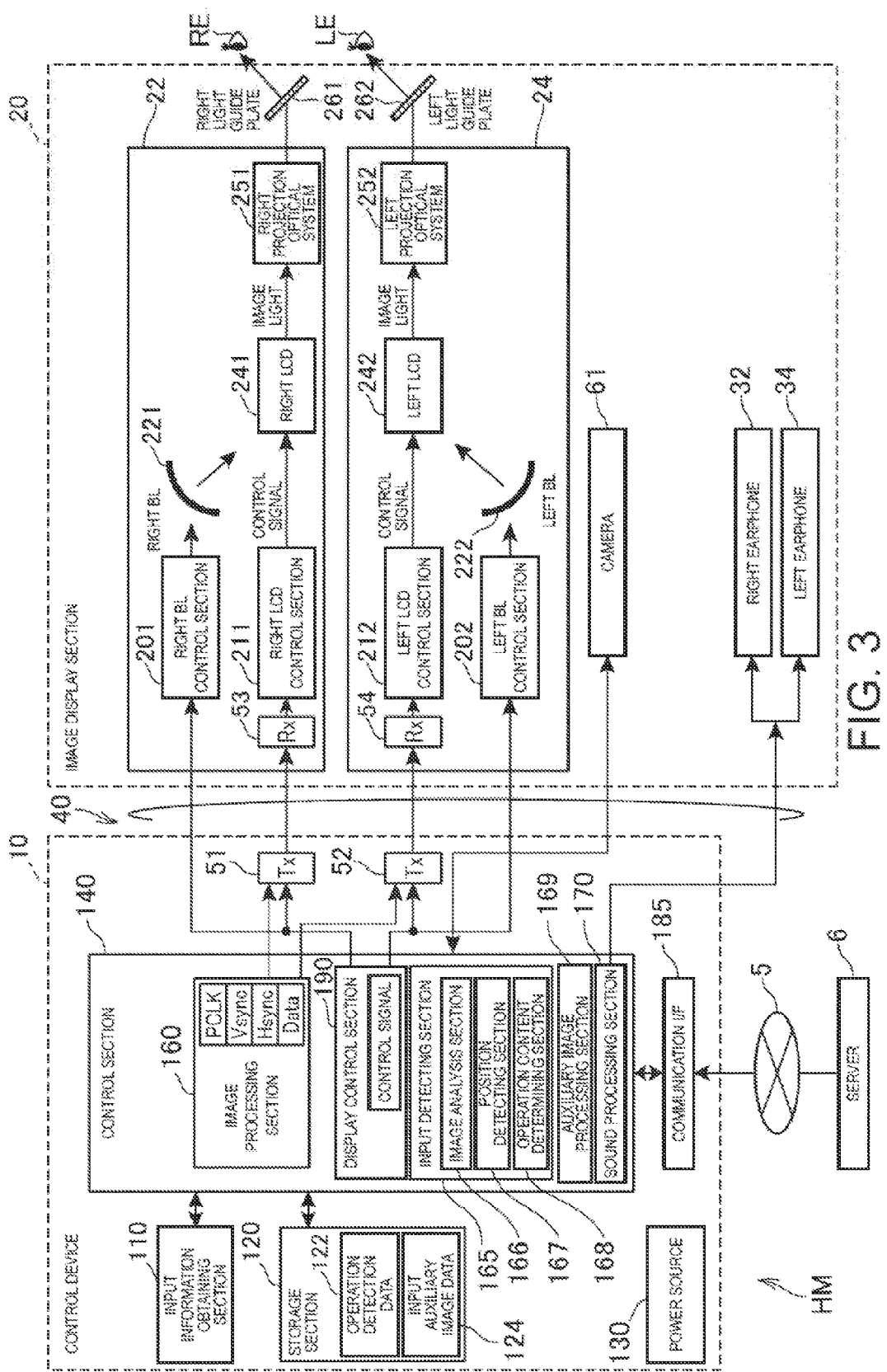
FIG. 3 is a functional block diagram of a control system of a head-mounted display device.

FIG. 3 is a functional block diagram illustrating a configuration of a control system of the head-mounted display device HM.

The control device 10 includes an input information obtaining section 110, a storage section 120, a power source 130, a control section 140, a communication interface 185, and transmission sections (Tx) 51 and 52. The respective sections are connected to each other through a bus (not shown).

The input information obtaining section 110 obtains signals based on inputs through the touch pad 14, the cross key 16, the power switch 18 and the like, for example. The storage section 120 stores a program or data using a semiconductor memory element, a magnetic storage device or the like. The power source 130 includes a secondary battery, for example, and supplies power to the respective sections of the head-mounted display device HM.

The control section 140 includes a CPU, a ROM, a RAM or the like, and executes a program stored in the ROM or the storage section 120 to control the respective sections of the head-mounted display device HM. The control section 140 executes the program to also function as an image processing section 160, an input detecting section 165 (operation detecting section), an auxiliary image processing section 169, a sound processing section 170 and a display control section 190.

The image processing section 160 generates a signal to be supplied to the image display section 20 on the basis of content or the like input through the communication interface 185, and transmits the result to the image display section 20. In a case where an analog signal is input through the communication interface 185, the image processing section 160 performs an A/D conversion process to generate digital image data (Data), and outputs the result together with a clock signal (PCLK), a vertical synchronization signal (VSync) and a horizontal synchronization signal (HSync). Further, in a case where digital image data is input through the communication interface 185, the image processing section 160 performs various processes such as frame rate conversion or resolution conversion, and outputs the processed digital image data together with a clock signal, a vertical synchronization signal and a horizontal synchronization signal.

The signal output by the image processing section 160 is input to the right display drive section 22 of the image display section 20 through the transmission section 51, and is input to the left display drive section 24 through the transmission section 52.

The display control section 190 generates control signals that control the right display drive section 22 and the left display drive section 24. Specifically, the display control section 190 individually controls driving ON/OFF of the right LCD 241 using a right LCD control section 211, driving ON/OFF of a right backlight 221 using a right backlight control section 201, driving ON/OFF of the left LCD 242 using a left LCD control section 212, driving ON/OFF of a left backlight 222 using a left backlight control section 202, or the like according to the control signals, to thereby control generation and emission of image light in each of the right display drive section 22 and the left display drive section 24. For example, the display control section 190 causes both of the right display drive section 22 and the left display drive section 24 to generate image light, only one of them to generate image light, or neither of them to generate image light.

The display control section 190 transmits the control signals for the right LCD control section 211 and the left LCD control section 212 through the transmission sections 51 and 52, respectively. Further, the display control section 190 transmits the control signals for the right backlight control section 201 and the left backlight control section 202, respectively.

The sound processing section 170 obtains a sound signal included in content, amplifies the obtained sound signal, and supplies the amplified sound signal to a right earphone 32 and left earphone 34 of the image display section 20 through the connection section 40.

The communication interface 185 is connected to an external communication line 5, and executes communication with an external server 6 through the communication line 5. The communication interface 185 transmits or receives a variety of data to or from the server 6 under the control of the control section 140. A specific communication line that connects the communication interface 185 and the communication line 5 and forms the communication line 5 may be provided in a wired or wireless manner.

Further, the communication interface 185 is connected to an external device such as a personal computer, a mobile phone terminal, a game machine, or a video reproduction device such as a DVD player, and outputs an analog video signal or image data of a variety of content input from these devices to the display control section 190. The communication interface 185 may include a connector or an interface circuit that is connected to these devices in a wired manner, or may include a short-range wireless communication interface such as a wireless LAN or Bluetooth (registered trademark).

The image display section 20 includes the right display drive section 22, the left display drive section 24, the right light guide plate 261 as the right optical image display section 26, the left light guide plate 262 as the left optical image display section 28, the camera 61, the right earphone 32 and the left earphone 34.

The right display drive section 22 includes a reception section (Rx) 53, the right backlight (BL) control section 201 and the right backlight (BL) 221, the right LCD control section 211 and the right LCD 241 that function as a display element, and the right projection optical system 251.

The reception section 53 receives a signal input from the transmission section 51. The right backlight control section 201 drives the right backlight 221 on the basis of a control signal input to the reception section 53. The right LCD control section 211 drives the right LCD 241 on the basis of a clock signal, a vertical synchronization signal, a horizontal synchronization signal and right eye image data input to the reception section 53. The right LCD 241 is a transmissive liquid crystal panel in which plural pixels are arranged in a matrix form, which is driven by the right LCD control section 211 to draw various images.

Similarly, the left display drive section 24 includes a reception section (Rx) 54, the left backlight (BL) control section 202 and the left backlight (BL) 222, the left LCD 242 that functions as a display element, and the left projection optical system 252.

The right backlight control section 201, the right LCD control section 211, the right backlight 221 and the right LCD 241 are collectively referred to as a right "image light generating section", and the left backlight control section 202, the left LCD control section 212, the left backlight 222 and the left LCD 242 are collectively referred to as a left "image light generating section". Further, the right holding section 21 and the left holding section 23 are collectively and simply referred to as a "holding section", the right display drive section 22 and the left display drive section 24 are collectively and simply referred to as a "display drive section", and the right optical image display section 26 and the left optical image display section 28 are collectively and simply referred to as an "optical image display section".

Further, the display section according to the invention is configured by the display drive section and the image light generating section. The display section may include an optical image display section, or may include a light guiding section.

The reception section 54 receives a signal input from the transmission section 52. The left backlight control section 202 drives the left backlight 222 on the basis of a control signal input to the reception section 54. The left LCD control section 212 drives the left LCD 242 on the basis of a clock signal, a vertical synchronization signal, a horizontal synchronization signal and left eye image data input to the reception section 54. The left LCD 242 is a transmissive liquid crystal panel in which plural pixels are arranged in a matrix form, which is driven by the left LCD control section 212 to draw various images.

In the following description, the virtual image that the user views using the head-mounted display device HM is referred to as an "image". This image is an image recognized by the user when images formed in the right LCD 241 and the left LCD 242 are formed on the retinas of the user. Further, the operation of the head-mounted display device HM that causes the user to view the virtual image is referred to as "display".

The control section 140 displays images of a variety of content input through the communication interface 185 using the image display section 20. Further, when displaying image of content including sound, the control section 140 displays the image and outputs sound through the right and left earphones 32 and 34. Thus, the user may view and hear a variety of video content.

Further, the head-mounted display device HM may display an input auxiliary image for operation by the right display drive section 22 and the left display drive section 24, and may perform an operation based on the input auxiliary image in a photographing range of the camera 61, to thereby input a character or figure.

This operation is performed by moving a finger of the user, a pen-type or bar-shaped operation device, or an indicator such as a laser pointer or a light source of an LED or the like in the photographing range of the camera 61.

The input auxiliary image is an image displayed by the image display section 20 for input of the character or figure using the indicator. For example, the input auxiliary image is a virtual keyboard in which characters are arranged, a ruled line for performing handwriting character input, or the like. The input auxiliary image will be described later.

The control section 140 includes the input detecting section 165. The input detecting section 165 includes the image analysis section 166 that obtains the photographed image data of the camera 61 and analyzes the photographed image data to detect the indicator, a position detecting section 167 that detects the position and/or movement of the indicator detected by the image analysis section 166, and an operation content determining section 168 that specifies content input on the basis of the position and/or movement of the indicator detected by the position detecting section 167.

Operation detection data 122 that includes characteristics of the shape and color of the indicator is stored in the storage section 120. The image analysis section 166 extracts an image of the indicator from the photographed image data on the basis of the operation detection data 122, and the position detecting section 167 detects the indication position of the indicator on the basis of the extracted image. The indication position of the indicator corresponds to a tip of the finger of the user, a tip of the operation device, an emission position of the light source or the like, for example. Further, the position detecting section 167 detects the indication positions of the indicator from photographed image data on plural still images that are continuously photographed or plural frames that form moving image data, compares these plural indication positions with each other, to thereby detect a temporal change of the indication position, in other words, the movement or track of the indication position. Further, the operation content determining section 168 specifies the input content, that is, the figure or character on the basis of the movement or track of the indication position.

Data that indicates the condition of the movement or track of the indication position is included in the operation detection data 122. The data includes data that indicates the direction of the movement of the indication position, the size of the movement, the speed of the movement, the time for a series of movements, the shape of the track, and the like. In a case where the movement or track of the indication position detected by the position detecting section 167 corresponds to the condition included in the operation detection data 122, the operation content determining section 168 detects that the content corresponding to the condition is input. The operation content determining section 168 may determine and specify plural types of input content using plural different conditions included in the operation detection data 122.

Further, the control section 140 includes the auxiliary image processing section 169. When performing the input operation using the indicator, the auxiliary image processing section 169 generates data for displaying the input auxiliary image, outputs the generated data to the display control section 190, and displays the output data using the right display drive section 22 and the left display drive section 24.

Input auxiliary image data 124 that includes image data or vector data for displaying, for example, the virtual keyboard or the ruled line is stored in the storage section 120. Data for displaying plural types of input auxiliary images may be included in the input auxiliary image data 124. In this case, the auxiliary image processing section 169 selects and uses data from the input auxiliary image data 124.

Figure 4A:
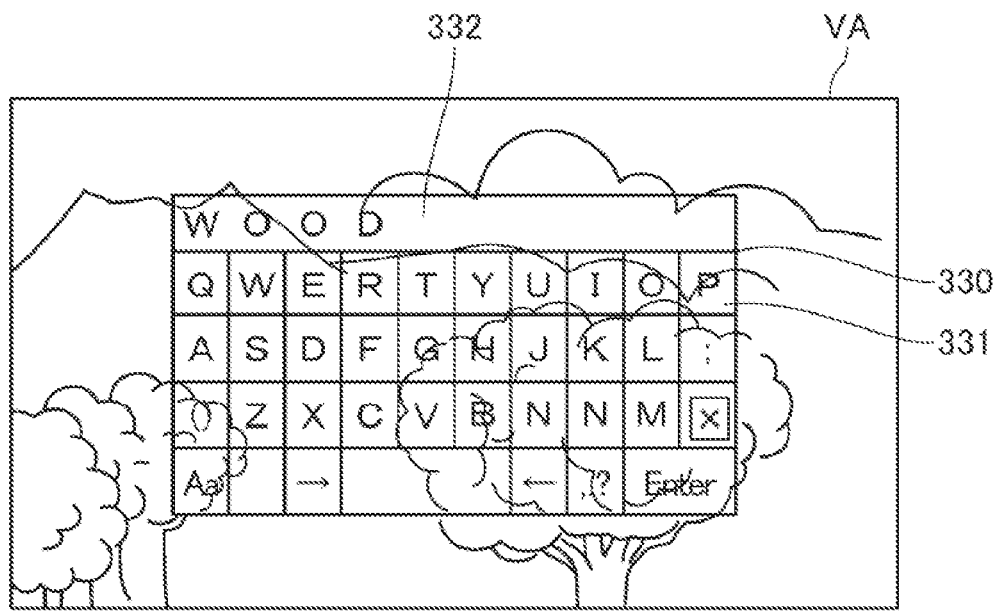
Figure 4B:
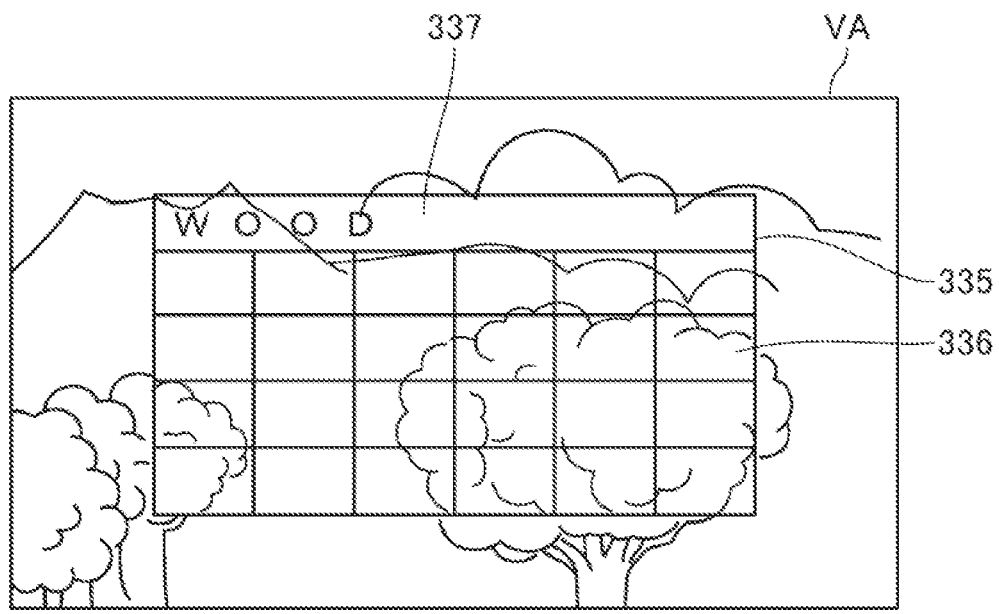

FIGS. 4A and 4B are diagrams illustrating examples of an input auxiliary image displayed by a head-mounted display device HM and an input operation thereof, in which FIG. 4A illustrates an example in which a virtual keyboard is used, and FIG. 4B illustrates an example in which a virtual input board including an input auxiliary line is used. In FIGS. 4A and 4B, images viewed by a user are shown.

In the example shown in FIG. 4A, a virtual keyboard 330 is displayed under the control of the auxiliary image processing section 169. The virtual keyboard 330 corresponds to an input auxiliary image that includes a key arranging section 331 for selecting a character and an input character display section 332 in which the selected character is displayed. Characters are arranged similarly to the typical QWERTY keyboard in the key arranging section 331, and a frame for selecting each character is displayed therein. As shown in FIG. 4A, the virtual keyboard 330 is configured by lines or characters, and a background color thereof is a color that does not impair transmittance of the outside light OL. Thus, the virtual keyboard 330 and the outside scene overlap each other to be viewed to the user.

When using the finger as the indicator, for example, the user performs an operation so that the user's finger overlaps with a desired character on the key arranging section 331. That is, the operation is performed so that the indicator overlaps with the key arranging section 331. The input detecting section 165 detects the indicator of the user by the image analysis section 166, and detects the indication position of the indicator by the position detecting section 167. Further, the operation content determining section 168 compares the display position (position viewed by the user) of the virtual keyboard 330 in the visual field of the user with the indication position detected by the position detecting section 167, to thereby specify the character selected by the operation of the user.

Further, the control section 140 displays the character specified by the operation content determining section 168 in the input character display section 332 as an input character.

In the example in FIG. 4A, four characters of "W", "O", "O" and "D" that are selected and designated by the indicator such as a finger of the user are displayed in the input character display section 332.

In the example shown in FIG. 4B, a virtual input board 335 in which ruled lines are arranged at equal intervals in a longitudinal direction and at equal intervals in a transverse direction is displayed under the control of the auxiliary image processing section 169. The virtual input board 335 is an input auxiliary image that includes an input area 336 that is an operation area where an operation of drawing a character or figure is detected, and an input content display section 337 that displays content input by the operation in the input area 336, which is used in a case where the character or figure is drawn by the movement of the indicator for input. The virtual input board 335 is configured by characters and lines similarly to the virtual keyboard 330, and a background color thereof is a color that does not impair visibility of the outside light OL. Thus, the virtual input board 335 and the outside scene overlap each other to be viewed to the user.

In the example in FIG. 4B, characters are input one by one in a box formed by the ruled line of the input area 336. In a case where the input area 336 is displayed, the user moves the indicator viewed to overlap with the virtual input board 335 in the box to draw a character or figure. The input detecting section 165 detects the indicator by the image analysis section 166, and detects the indication position of the indicator by the position detecting section 167. The operation content determining section 168 compares the display position of the virtual input board 335 with the indication position thereof, and then, in a case where it is determined that the track of the indicator in one box represents a specific character, the operation content determining section 168 determines that the character as an input character. In the example in FIG. 4B, input characters "W", "O", "O" and "D" are displayed in the input content display section 337.

The user who wears the head-mounted display device HM may operate the touch pad 14 or the cross key 16 of the control device 10 to display the virtual keyboard 330 or the virtual input board 335, thereby starting the input operation.

Further, in a case where light of a predetermined wavelength is detected in a predetermined detection area (input detection area) in the photographable range of the camera 61, the head-mounted display device HM displays the virtual keyboard 330 or the virtual input board 335 to provide a state where the input operation is available. Accordingly, the user may cause a device (light emitting device) that emits light of a predetermined wavelength to emit the light in the detection area, thereby starting the input operation.

In this case, the input detecting section 165 functions as an operation detecting section that detects the light of the predetermined wavelength. More specifically, the image analysis section 166 analyzes the photographed image data of the camera 61, and determines whether the light of the predetermined wavelength is included in the outside light OL. Further, the position detecting section 167 detects the emission position of the light of the predetermined wavelength detected by the image analysis section 166 as a position in the photographed image data. The operation content determining section 168 determines whether the light of the predetermined wavelength corresponds to an instruction of input operation start using the virtual keyboard 330 or the virtual input board 335 on the basis of the position detected by the position detecting section 167.

The light detected by the input detecting section 165 may be a predetermined light. Here, the predetermined light may be light of one or plural predetermined wavelengths, for example. Further, the predetermined light may be light that is periodically emitted with a predetermined period or pattern, that is, pulse light, or may be light of which the intensity is periodically changed with a predetermined period or pattern. Further, the predetermined light may include a type in which the wavelength of light is changed periodically or with a predetermined pattern, for example, a type in which light beams of various colors are sequentially emitted. Further, the predetermined light may include a combination of the various types of lights. Further, the predetermined light may be a laser light, a visible light, an infrared light or an ultraviolet light. In the configuration in which the input detecting section 165 detects the predetermined light from the photographed image data of the camera 61, an imaging element of the camera 61 may receive and detect the predetermined light. Further, the input detecting section 165 is not limited to the camera 61, and other light receiving elements may be used.

The server 6 is a server that stores information for performing highlight in the head-mounted display device HM. The server 6 is accessible from a terminal device such as a personal computer (not shown) through the communication line 5, and stores information transmitted from the terminal device or the like. A specific configuration of the server 6 is not limited, and any configuration capable of obtaining information as the head-mounted display device HM performs data communication may be used.

The control section 140 may obtain the operation detection data 122 or the input auxiliary image data 124 from the server 6, and may store the data in the storage section 120.

A specific type of the light emitting device is not particularly limited, and may include any type having a light emitting function, which emits the predetermined light among the above-described various types of emitted lights. Further, the size of the device does not matter. For example, a portable phone (including a smart phone), a portable music player, a portable video player or the like includes a display screen or a light source such as an LED used as an indicator, and thus, may be used as the light emitting device. Further, since the control device 10 includes the lighting section 12, the control device 10 may be also used as the light emitting device. Furthermore, even a device that does not include a control device, such as a flashlight or a radio, may be used as the light emitting device.

The predetermined wavelength of the light detected by the input detecting section 165 may be arbitrarily set to enhance a user's convenience. For example, if the camera 61 has a configuration that includes an image sensor that detects an infrared light or a visible light, it is possible to set a wavelength of an infrared region or a visible region as the predetermined wavelength. Further, it is possible to particularly set an arbitrary wavelength of red, green or the like in the visible light, which may match with the color of the light source of the light emitting device used by the user. Further, the predetermined wavelength may be set to have a width to detect light that belongs to a predetermined wavelength region.

Further, in order to reliably prevent an operation due to an ambient light included in the outside light OL or light emitted by a device other than the light emitting device used by the user, the predetermined wavelength may be set to plural wavelengths or wavelength regions. In this case, it is possible to use a device that simultaneously emits the light of the set wavelength or plural wavelengths that belong to the wavelength region as the light emitting device, and it is thus possible to clearly distinguish light of only one wavelength. Thus, it is possible to prevent an operation that is not desired by the user.

Figure 5A:
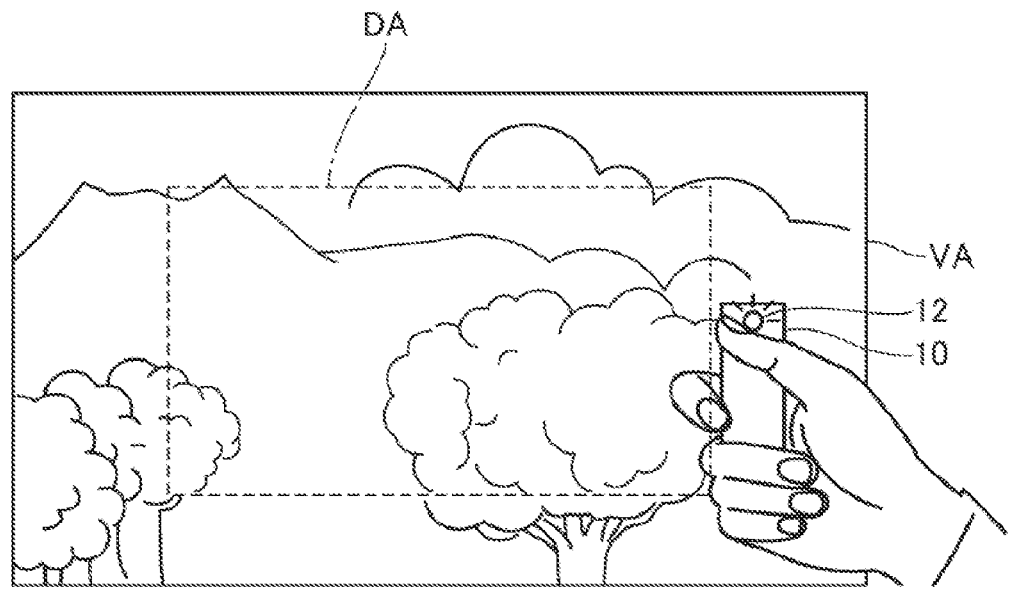
Figure 5B:
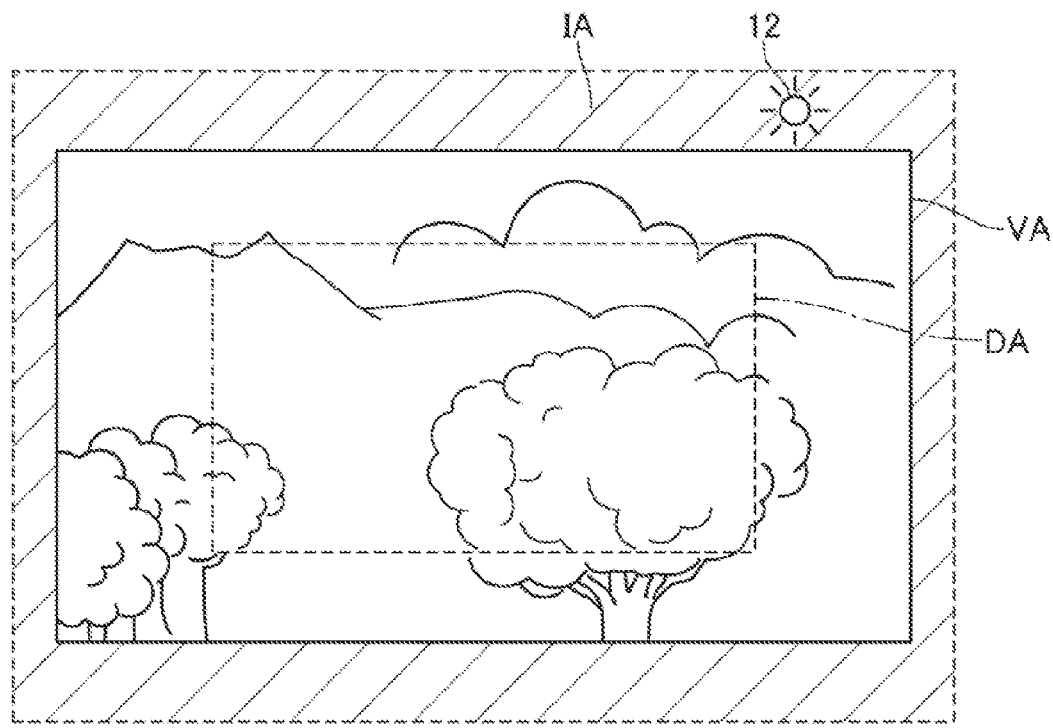

FIGS. 5A and 5B are diagrams illustrating an operation of the head-mounted display device HM, and illustrate operation states using a light emitting device, in which FIG. 5A illustrates an example of an operation using the light emitting device, and FIG. 5B illustrates an example in which a detection area where the operation of the light emitting device is detected is changed.

Reference sign VA in FIGS. 5A and 5B and FIGS. 7A and 7B represents a field of vision (visual field) of a user who wears the head-mounted display device HM, and reference sign DA represents a displayable area in the image display section 20. The displayable area DA represents a range where an image is viewed by the image light L, and is determined by displayable ranges of the right LCD 241 and the left LCD 242, the sizes of the right backlight 221 and the left backlight 222, optical characteristics of the right projection optical system 251, the left projection optical system 252, the right light guide plate 261 and the left light guide plate 262, and the like. In the present embodiment, the displayable area DA of a rectangular shape is present approximately at the center of the field of vision VA. The head-mounted display device HM may display an image in the displayable area DA.

In the following examples, the control device 10 is used as the light emitting device.

In the example in FIG. 5A, it is assumed that the photographable range of the camera 61 matches the visual field VA and the entire photographable range is set as a detection area of light of a predetermined wavelength.

If the user holds the control device 10 by the hand and lights the lighting section 12 at a position that overlaps with the visual field VA that is the detection area, light emitted by the lighting section 12 is detected by the input detecting section 165. In this example, the lighting section 12 includes a red LED as the light source, for example, and the input detecting section 165 is set to detect light of a wavelength region including an emission color of the red LED from the photographed image of the camera 61. The input detecting section 165 determines that the position where the light is detected is the set detection range, and controls the auxiliary image processing section 169 to display the virtual keyboard 330 or the virtual input board 335 as the input auxiliary image. Thereafter, the input detecting section 165 detects an indicator such as a finger of the user at the position that overlaps with the virtual keyboard 330 or the virtual input board 335, and receives the input operation.

Further, in a case where the photographable range of the camera 61 is larger than the visual field VA, the detection area may be set to a range wider than the visual field VA, and light emitted by the light emitting device may be detected in the detection area.

In the example in FIG. 5B, the camera 61 may photograph a range including the vicinity of the visual field VA, and a detection area IA is set around the visual field VA. The detection area IA shown in FIG. 5B is an area that is disposed around the visual field VA and does not include the visual field VA, which is indicated as slant lines in FIG. 5B. If the lighting section 12 emits light in the detection area IA, the input detecting section 165 detects the light, and an input auxiliary image is displayed. In the example in FIG. 5B, since the detection area IA does not include the visual field VA, the light of the lighting section 12 is not seen to the user, which is useful in a case where the user feels that the light of the lighting section 12 is troublesome. Further, the detection area IA may be set to a wide range including the visual field VA.

In the operation based on the light emitting device such as the control device 10, it is not necessary to perform lighting from a state where the light source of the light emitting device is extinguished in the detection area IA. That is, in a case where the light emitting device in the lighted state moves from the outside of the detection area IA to the inside thereof, similarly to a case where the light emitting device is switched from extinction to lighting in the detection area IA, the light is detected. Accordingly, the user may similarly operate the head-mounted display device HM by moving the light emitting device that is lighted.

Figure 6:
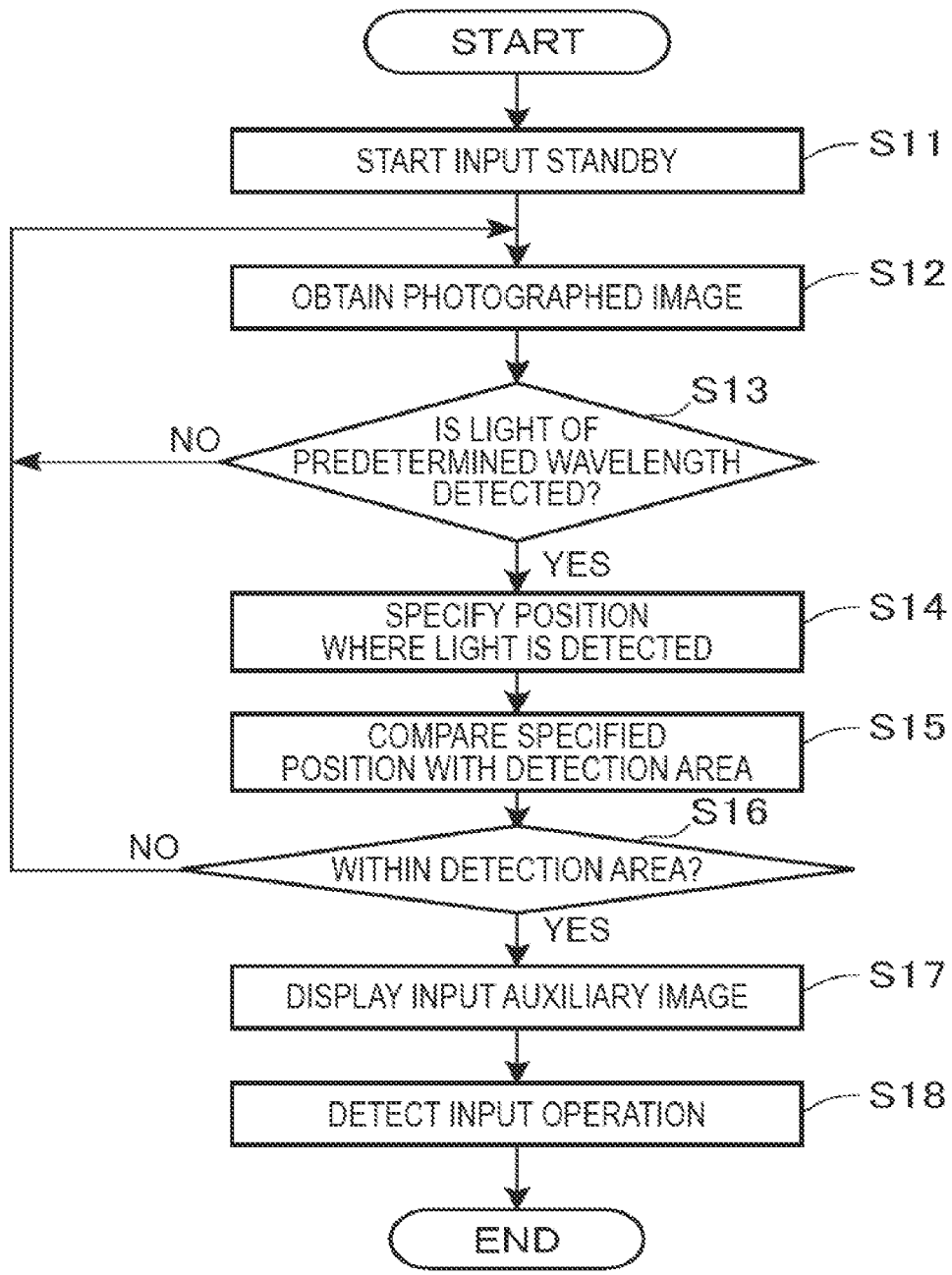
FIG. 6 is a flowchart illustrating an operation of a head-mounted display device.

FIG. 6 is a flowchart illustrating an operation of the head-mounted display device HM, and particularly, illustrates an operation of displaying an input auxiliary image corresponding to operation of the light emitting device.

If power is turned on and the operation is started, the head-mounted display device HM waits for an operation based on the light emitting device, that is, light of set wavelength (step S11).

The input detecting section 165 obtains photographed image data of the camera 61 (step S12), and detects the light of the set wavelength by the image analysis section 166 on the basis of the photographed image data (step S13). Here, if the light of the set wavelength is not detected (No in step S13), the input detecting section 165 returns to step S12. On the other hand, if the light of the set wavelength is detected by the image analysis section 166 (Yes in step S13), the position detecting section 167 specifies the position of the detected light (step S14). Further, the operation content determining section 168 compares the position specified by the position detecting section 167 with the detection area (step S15).

Here, if the position where the light of the light emitting device is detected is not within the detection area (No in step S16), the input detecting section 165 returns to step S12. On the other hand, if the position where the light of the light emitting device is detected is within the detection area (Yes in step S16), the control section 140 displays an input auxiliary image by the auxiliary image processing section 169 (step S17), detects the input operation (for example, character input operation) using the input auxiliary image (step S18), and then, finishes the operation.

In this manner, in the head-mounted display device HM, by causing the light emitting device including the light source such as the control device 10 to emit light at the detection area set in the photographing range of the camera 61 to display the virtual keyboard 330 or the virtual input board 335, it is possible to start character input or figure input.

Further, in the head-mounted display device HM, it is possible to operate the head-mounted display device HM using the light emitted by the light emitting device as an indicator.

Figure 7A:
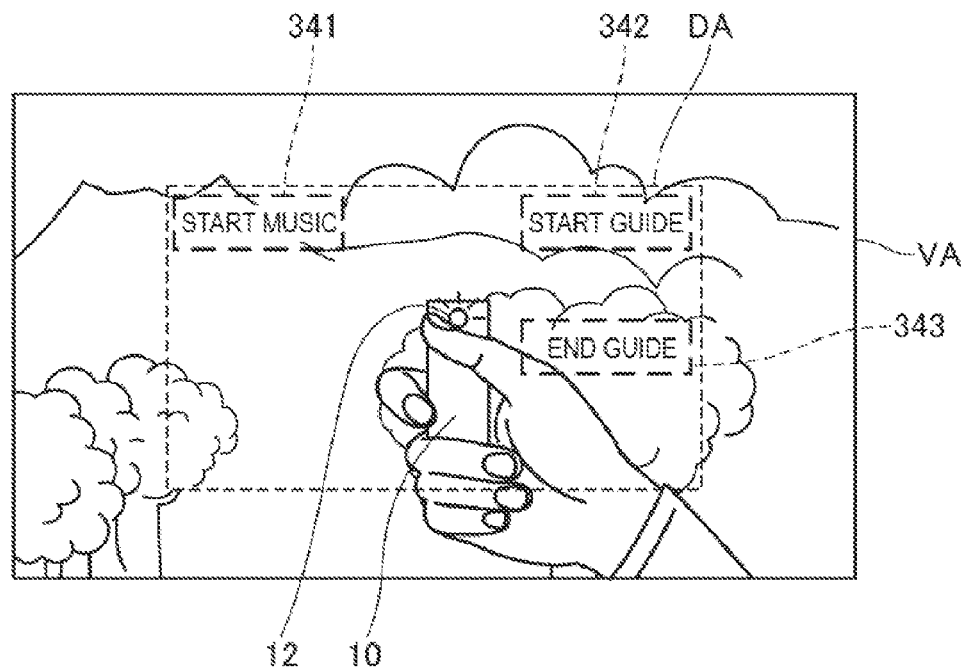
Figure 7B:
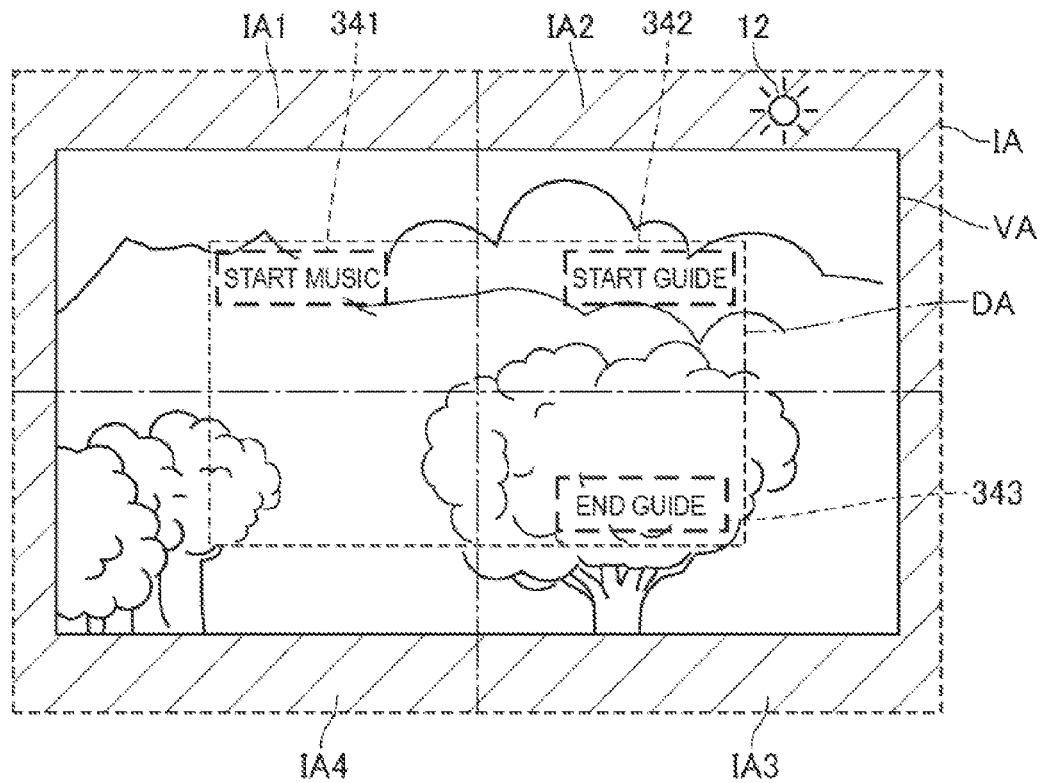

FIGS. 7A and 7B are diagrams illustrating an operation of the head-mounted display device HM, and illustrate operation states using a light emitting device, in which FIG. 7A illustrates an example of an operation using the light emitting device, and FIG. 7B illustrates an example in which a detection area where the operation of the light emitting device is detected is changed.

In the example in FIG. 7A, it is assumed that the photographable range of the camera 61 matches the visual field VA and the entire photographable range is set as a detection area of light of a predetermined wavelength.

Icons 341, 342 and 343 for controlling the functions of the head-mounted display device HM by the light emitting device are displayed in the displayable area DA. The icons 341, 342 and 343 form a graphical user interface (GUI), and if any icon is selected and designated, the head-mounted display device HM executes a function corresponding to the designated icon. In the example in FIG. 7A, the icon 341 corresponds to a music reproduction function, the icon 342 corresponds to a start instruction of a navigation function, and the icon 343 corresponds to an end instruction of the navigation function. The user may cause the lighting section 12 of the control device 10 to light at a position that overlaps with any one of the icons 341, 342 and 343, to thereby execute the function.

Further, as shown in FIG. 7B, in a case where the detection area IA is disposed outside the visual field VA, detection areas corresponding to the icons 341, 342 and 343 may be provided in the detection area IA, and an operation in each detection area may be detected as the operation for the icons 341, 342 and 343.

In the example in FIG. 7B, the detection area IA disposed around the visual field VA is divided into four detection areas IA1, IA2, IA3, and IA4, and the divided detection areas IA1, IA2 and IA3 correspond to the icons 341, 342 and 343, respectively. In this example, an icon corresponding to the detection area IA4 is not present.

In the example in FIG. 7B, in a case where the light emitted by the lighting section 12 is detected in the detection area IA1 instead of the icon 341, the control section 140 executes the function corresponding to the icon 341. Similarly, in a case where the light of the lighting section 12 is detected in the detection areas IA2 and IA3, the functions corresponding to the icons 342 and 343 are executed. In the example in FIG. 7B, since the detection area IA does not include the visual field VA, the light of the lighting section 12 is not seen to the user, which is useful in a case where the user feels that the light of the lighting section 12 is troublesome. Further, in a state where the lighting section 12 is lighted, for example, if the lighting section 12 moves toward the visual field VA from the outside of the detection area IA, the light is detected when the lighting section 12 reaches the detection area IA. In this case, the user may execute the functions corresponding to the icons 341, 342 and 343 by the operation of moving the control device 10. Further, it is not necessary to match the position of the lighting section 12 with the icons 341, 342 and 343, and it is thus possible to simply operate the head-mounted display device HM.

Figure 8:
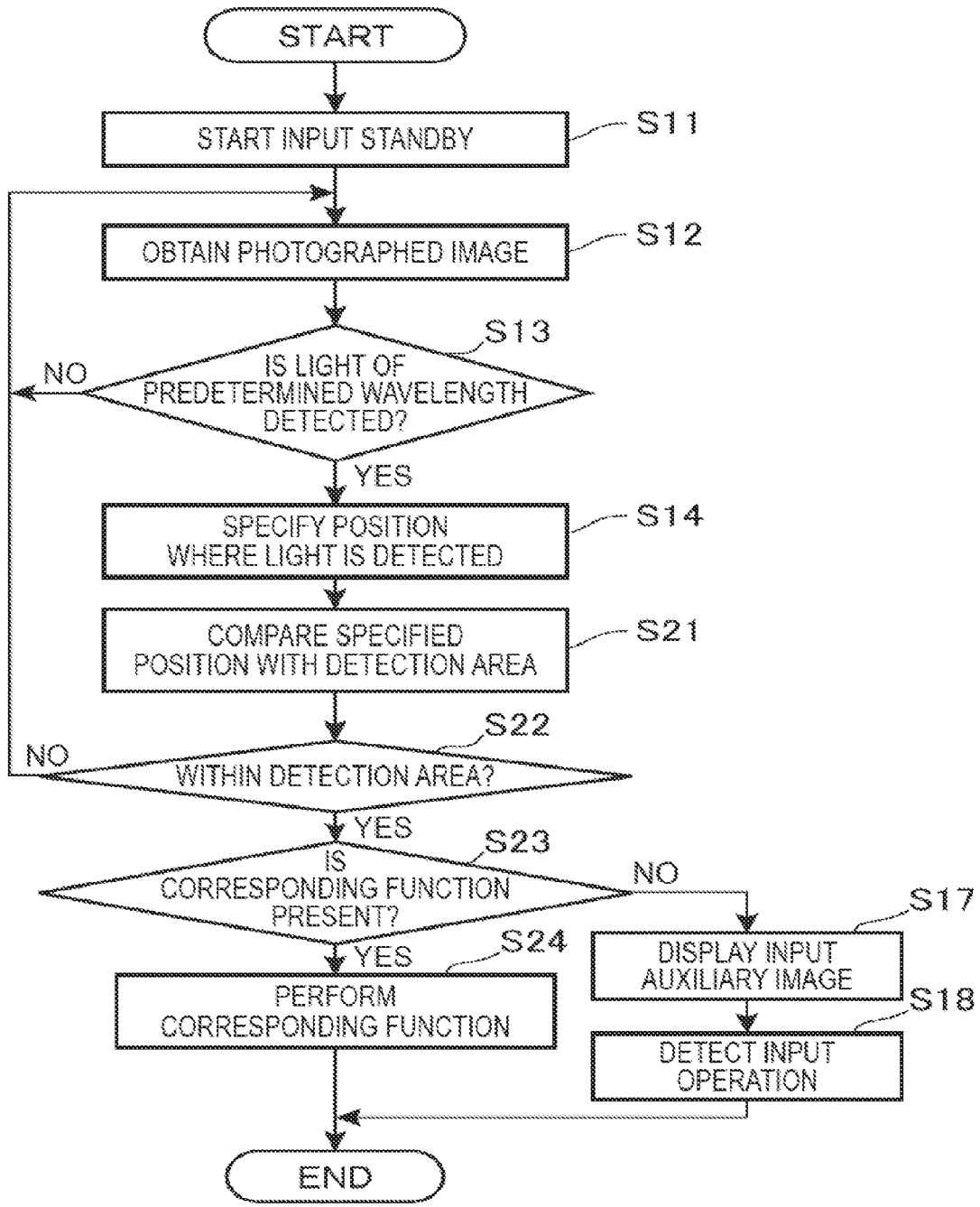
FIG. 8 is a flowchart illustrating an operation of a head-mounted display device.

FIG. 8 is a flowchart illustrating an operation of the head-mounted display device HM, and particularly, illustrates an operation of executing a function corresponding to an icon, corresponding to operation of the light emitting device.

Since operations of step S11 to S14 in FIG. 8 are the same as in FIG. 6, description thereof will be omitted.

The operation content determining section 168 compares the position specified by the position detecting section 167 in step S14 with the position of the icon provided in the detection area or the position corresponding to the icon (for example, the detection areas IA1 to IA3) (step S21). Here, if the specified position is not within the detection area (No in step S22), the input detecting section 165 returns to step S12. On the other hand, if the specified position is within the detection area (Yes in step S22), the operation content determining section 168 determines whether the function corresponding to the detected position is set (step S23). Here, if the corresponding function is present, that is, if the position specified by the position detecting section 167 in step S14 overlaps with the position of the icon provided within the detection area or the position corresponding to the icon (Yes in step S23), the control section 140 executes the corresponding function (step S24), and finishes the present process.

On the other hand, if the position specified by the position detecting section 167 in step S14 does not correspond to the position of the icon provided within the detection area or the position corresponding to the icon, it is determined that the corresponding function is not set (No in step S23), and the procedure goes to a state where a normal input operation is available. That is, the control section 140 displays an input auxiliary image by the auxiliary image processing section 169 (step S17), detects the input operation (for example, character input operation) using the input auxiliary image (step S18), and then, finishes the operation.

As described above, the head-mounted display device HM according to the embodiment to which the invention is applied includes the display section that causes, by outputting the image light, the scene viewed by the outside light other than the image light and the image based on the image light to be viewed, and the input detecting section 165 that detects the input operation in a case where the predetermined light is detected in the range corresponding to the image. According to this configuration, if the predetermined light is detected in the range corresponding to the image viewed by the user, the head-mounted display device HM detects the input operation. Thus, the user may cause the input operation to be detected only by operating any device for emission of the predetermined light. Since the input operation is possible by emitting light by the light emitting device or the like, for example, so that the predetermined light is detected, it is possible to perform the input operation without impairing the visibility of the scene viewed by the user, for example, with less influence on the scene viewed by the user.

Further, since the head-mounted display device HM according to the embodiment includes the display section that outputs the image light to overlap with the outside light and causes the image to be viewed, and the input detecting section 165 that detects the input operation in a case where the predetermined light is detected in the range corresponding to the image, to detect the input operation on the basis of the predetermine light, the user may perform the input operation only by operating the light emitting device to emit the predetermined light. Since there is no concern of making a strange impression on the people around the user, the user may freely execute the input operation without feeling anxious about the surrounding environment. Thus, it is possible to reduce a psychological effect on the user regarding the possibility that the user who uses the head-mounted display device can be anxious about making a strange impression to the people in the surrounding environment, and thus, it is possible to provide a simple use operation method in the head-mounted display device to enhance the operability.

Further, the light emitting device used by the user may not be electrically connected to the head-mounted display device HM, and may not necessarily be controlled in association with the operation of the head-mounted display device HM. That is, the light emitting device may be used without any limitation as long as it can emit the light of the predetermined wavelength. For example, a device for other usages may be used. Thus, it is not necessary to use an exclusive device, thereby making it possible to simplify the operation. Further, since the detection area where the light of the predetermined wavelength is detected is present in the range corresponding to the displayable area DA of the image viewed by the user or the visual field VA, it is possible to accurately perform the input operation without detection of the input operation due to an unrelated ambient light. Accordingly, it is possible to enhance the operability of the head-mounted display device.

Further, since the head-mounted display device HM includes the camera 61 that detects the outside light corresponding to the visual field of the user and the input detecting section 165 detects the light of the predetermined wavelength on the basis of the photographed image data of the camera 61, it is possible to further enhance the operability.

Further, since the head-mounted display device HM performs display indicating the input operation detected by the input detecting section 165 by the auxiliary image processing section 169, it is possible to easily and accurately perform the operation.

Further, since the input detecting section 165 detects the input operation in a case where the light of the predetermined wavelength is detected at the position corresponding to the detection area IA that is virtually set as shown in FIGS. 5A and 5B and FIGS. 7A and 7B, it is possible to more accurately perform the input operation without detection of the input operation by an unrelated ambient light.

Further, the light of the predetermined wavelength may be a visible light. In this case, since the user can view the light emitted for the input operation, it is possible to easily and accurately perform the operation.

Further, the light of the predetermined wavelength may include light with plural wavelength regions. In this case, since the input operation is detected by the light with the plural wavelength regions, it is possible to reduce a possibility that the input operation is detected due to an unrelated ambient light, and thus, it is possible to more accurately perform the input operation.

Further, the display section of the head-mounted display device HM includes the right display drive section 22 and the left display drive section 24 that generate and emit an image light for display of an image using the display image data, and the right light guide plate 261 and the left light guide plate 262 that guide the emitted image light to the eyes of the user. Further, an outside light passes through the right light guide plate 261 and the left light guide plate 262, and is incident onto the right eye RE and the left eye LE of the user together with the image light.

Thus, using the head-mounted display device in which the image light is guided to the right eye RE and the left eye LE by the right light guide plate 261 and the left light guide plate 262 and the outside light passes through the right light guide plate 261 and the left light guide plate 262 and is guided to the right eye RE and the left eye LE, by detecting a predetermined light as the outside light, it is possible to detect the input operation.

Further, in the examples in FIGS. 7A and 7B, since the icons 341, 342 and 343 that are plural operation targets or the detection areas IA1 to IA3 corresponding to the respective icons are arranged in the detection area IA and the input detecting section 165 determines that an icon corresponding to the position where the light of the predetermined wavelength is detected is operated, the user may operate plural types of input operations according to the position where the light emitting device emits light, to thereby make it possible to further enhance the operability.

The above-described embodiment is an example to which the invention is applied, and the configuration and application of the invention are not limited to the configuration of the above embodiment. For example, the input auxiliary image is not limited to the virtual keyboard 330 and the virtual input board 335 shown in FIGS. 4A and 4B, and may be any auxiliary image for the input operation of the user, or may be any image that guides the operation using other figures without any limitation to the ruled lines.

Further, in the above embodiment, the configuration in which the image display section 20 that a user wears like glasses is provided has been described as an example of the head-mounted display device, but the invention is not limited thereto. An image display section that a user wears like a cap, an image display section assembled in a helmet or the like, instead of the image display section 20, may be provided. Further, the earphones 32 and 34 may employ an ear hook type or a head band type, or may be removed.

Further, in the above embodiment, for example, the configuration has been described in which the image light generating section includes the right backlight 221, the left backlight 222, the right backlight control section 201, the left backlight control section 202, the right LCD 241, the left LCD 242, the right LCD control section 211 and the left LCD control section 212. This embodiment is merely an example, and thus, the image light generating section may include a configuration for realizing a different method together with the above configuration or instead of the configuration. For example, the image light generating section may have a configuration that includes a self-luminous display such as an organic electro-luminescence (EL) panel, and a control section that controls light emission thereof. Further, the image light generating section may use LCOS (liquid crystal on silicon; registered trademark), a digital micro-mirror device (DMD) or the like, instead of the LCD. In this case, the image light generating section includes a light source such as LEDs, and modulates light emitted from the light source by the LCOS or DMD to generate image light.

Further, for example, it is also possible to apply the invention to a head-mounted display of a laser retinal projection type. That is, the image light generating section may be configured to include a laser light source and an optical system that guides the laser light source to the eyes of the user, and to cause laser light to be incident onto the eyes of the user for scanning on the retinas to form images on the retinas so that the user can view an image. In a case where the head-mounted display of the laser retinal projection type is employed, an "area where image light can be emitted in the image light generating section" may be defined as an image area recognized by the eyes of the user.

The optical system that guides the image light generated by the image light generating section in the head-mounted display to the eyes of the user may be configured to include an optical member that transmits outside light that is incident onto the device from the outside, and to cause the outside light to be incident onto the eyes of the user together with the image light. Further, the optical system may employ an optical member that is disposed in front of the eyes of the user to overlap a part or all of the visual field of the user. Further, the optical system having a scanning method which scans laser beams or the like to form an image light may be employed. Further, the optical system is not limited to a configuration that guides the image light inside the optical member, but may be configured to have a function of refracting and/or reflecting the image light toward the eyes of the user for guidance.

Further, in the above embodiment, the head-mounted display device HM mounted on the head of the user has been described as an example, but the embodiment of the invention is not limited thereto. The invention may be applied to a display device that enables view of a scene based on light other than the image light. Here, the scene based on the light other than the image light may be any scene that is viewable by a user using light such as an outside light other than the image light emitted by the display device or light emitted by a different device, which is not limited to a surrounding scene or image. For example, it is possible to apply the invention to a display device in which an image light is emitted to a display surface that is fixedly or movably disposed at a position separated from the user to form an image. The configuration that emits the image light may employ a discharge tube, LEDs, or a projector that uses laser light as a light source, for example. As a specific example, a configuration of a display device may be used in which an image light is projected to a window glass of a vehicle to cause a user who is on the vehicle or a user who is outside the car to view an image based on the image light and scenes inside and outside the vehicle. Further, for example, a configuration of a display device may be used in which an image light is projected to a transparent, semi-transparent or chromatic transparent display surface that is fixedly disposed, such as a window glass of a building, to cause a user who is in the vicinity of the display surface to view an image based on the image light and a scene through the display surface. In these configuration examples, an input detecting section may be provided on the user side of the display surface or on an opposite side thereof. Here, the input detecting section may be provided at a position separated from the display surface so that a predetermined light can be detected in a range where the image and the scene are viewable through the display surface. Further, the scene based on light other than the image light emitted by the display device may be any scene that is viewable by the user using light such as an outside light other than the image light emitted by the display device or light emitted by a different device, which is not limited to a surrounding scene or image.

Further, the invention may be applied to a head mounted display in which an optical member that serves as a display surface is provided in a range that is seen to a user and an image based on an image light is viewed using the optical member.

Further, the invention may be applied to a display device that uses a MEMS display technology.

The head-mounted display device HM of the embodiment has a configuration in which the light generated by the image light generating section including the right backlight 221, the left backlight 222, the right backlight control section 201, the left backlight control section 202, the right LCD 241, the left LCD 242, the right LCD control section 211 and the left LCD control section 212 is guided to the eyes of the user by the right light guide plate 261 and the left light guide plate 262.

On the other hand, a scanning optical system using a MEMS mirror may be employed. That is, an image display element may include a signal light forming section, a scanning optical system that has the MEMS mirror that scans light emitted from the signal light forming section, and an optical member that forms a virtual image by the light scanned by the scanning optical system. In this configuration, the light emitted by the signal light forming section is reflected by the MEMS mirror, is incident onto the optical member, is guided in the middle of the optical member, and reaches a virtual image forming surface. As the MEMS mirror scans the light, a virtual image is formed on the virtual image forming surface. The user captures the virtual image by the eyes to recognize the image. The optical component in this case may be an element that guides light through plural reflections like the right light guide plate 261 and the left light guide plate 262 in the above embodiment, and the virtual image forming surface may be a half mirror surface like the face 262A.

Further, the embodiment of the invention is not limited to the configuration in which the program executed by the control section 140 is stored in the storage section 120. For example, the program may be stored on a computer-readable portable recording medium, a storage device that is externally connected to the control device 10, or a device connected to the control device 10 through a wired or wireless communication line. In this case, the control device 10 may read the program for execution as necessary. Details of the other configurations of the head-mounted display device HM may be arbitrarily modified.

The entire disclosure of Japanese Patent Application No. 2013-000363, filed Jan. 7, 2013 is expressly incorporated by reference herein.

What is claimed is:

1. A display device comprising:
    an outside light detecting section that detects an outside light from an outside area outside of the display device, in a visual field of a user of the display device, and detects a hand-held control device overlapping the visual field in the outside light;
    a display section that outputs an image light to overlap with the outside light and causes a combined image to be viewed based on the outside light and the image light overlapping with the outside light; and an operation detecting section that detects an input operation in a case where the hand-held control device is detected by the outside light detecting section to be overlapping with the visual field at a position corresponding to an input detection area that is virtually set, wherein the input detection area is divided into a plurality of operation target areas each corresponding to one of a plurality of input operations, the operation detecting section detects which input operation to perform based on which one operation target area of the plurality of operation target areas the hand-held control device is positioned to overlap in the visual field, and the hand-held control device is a light source device that includes a lighting section that emits a predetermined light.

2. The display device according to claim 1, wherein the predetermined light is a visible light.

3. The display device according to claim 1, wherein the predetermined light includes light with a plurality of wavelength bands.

4. The display device according to claim 1, further comprising a display control section that performs a display indicating the input operation detected by the operation detecting section in the image.

5. The display device according to claim 1, wherein the display device is a head-mounted display device that causes a user to view the image, the display section includes:

an image light generating section that generates and emits the image light for display of the image using display image data; and an optical member that guides the emitted image light to eyes of the user, and the outside light passes through the optical member and is incident onto the eyes of the user together with the image light.

6. The display device according to claim 1, wherein the input detection area that is virtually set is a virtual keyboard.

7. The display device according to claim 1, wherein the outside light detecting section detects the outside light both inside and outside of the visual field, and the input detection area that is virtually set is positioned outside of the visual field of the user of the display device.

8. The display device according to claim 1, wherein the outside light detecting section detects the hand-held control device by detecting the predetermined light emitted from the lighting section of the hand-held control device.

9. A head-mounted display device comprising:

an outside light detecting section that detects an outside light from an outside area outside of the head-mounted display device, in a visual field of a user of the display device, and detects a hand-held control device overlapping the visual field in the outside light;

a display section that outputs an image light to overlap with the outside light and causes a combined image to be viewed based on the outside light and the image light overlapping with the outside light; and an operation detecting section that detects an input operation in a case where the hand-held control device is detected to be overlapping with the visual field at a position corresponding to an input detection area that is virtually set, wherein the input detection area is divided into a plurality of operation target areas each corresponding to one of a plurality of input operations, the operation detecting section detects which input operation to perform based on which one operation target area of the plurality of operation target areas the hand-held control device is positioned to overlap in the visual field, and the hand-held control device is a light source device that includes a lighting section that emits a predetermined light.

10. A control method of a display device, comprising:

detecting an outside light from an outside area outside of the display device, in a visual field of a user of the display device;

detecting a hand-held control device overlapping the visual field in the outside light;

outputting an image light to overlap with the outside light and causing a combined image to be viewed based on the outside light and the image light overlapping with the outside light; and detecting an input operation in a case where the hand-held control device is detected by the outside light detecting section to be overlapping with the visual field at a position corresponding to an input detection area that is virtually set, wherein the input detection area is divided into a plurality of operation target areas each corresponding to one of a plurality of input operations, the input operation to be performed is detected based on which one operation target area of the plurality of operation target areas the hand-held control device is positioned to overlap in the visual field, and the hand-held control device is a light source device that includes a lighting section that emits a predetermined light.

11. A control method of a display device mounted on a head of a user and that includes an outside light detecting section that detects an outside light from an outside area outside of the display device, in a visual field of a user of the display device, and detects a hand-held control device overlapping the visual field in the outside light, and a display section that outputs an image light to overlap with an outside light and causes a combined image to be viewed based on the outside light and the image light overlapping with the outside light, the method comprising:

detecting an input operation in a case where the hand-held control device is detected by the outside light detecting section to be overlapping with the visual field at a position corresponding to an input detection area that is virtually set, wherein the input detection area is divided into a plurality of operation target areas each corresponding to one of a plurality of input operations, the input operation to be performed is detected based on which one operation target area of the plurality of operation target areas the hand-held control device is positioned to overlap in the visual field, and the hand-held control device is a light source device that includes a lighting section that emits a predetermined light.

* * * * *